(12) United States Patent
Boner

(10) Patent No.: US 6,545,600 B1
(45) Date of Patent: Apr. 8, 2003

(54) VEHICLE-TRAILER SIGNAL CONVERTER

(75) Inventor: Frank A. Boner, Mishawaka, IN (US)

(73) Assignee: Electro-Transfer Systems, Inc., South Bend, IN (US)

( * ) Notice: Subject to any disclaimer, the term of this patent is extended or adjusted under 35 U.S.C. 154(b) by 0 days.

(21) Appl. No.: 09/602,165

(22) Filed: Jun. 22, 2000

(51) Int. Cl.$^7$ ................................................. B60Q 1/26
(52) U.S. Cl. ........................ 340/468; 340/431; 307/10.1; 315/77
(58) Field of Search .................. 340/468, 431, 340/472, 473; 307/10.1, 10.8, 9.1; 315/80, 77

(56) References Cited

U.S. PATENT DOCUMENTS

| | | |
|---|---|---|
| 3,970,860 A | 7/1976 | Purdy |
| 3,981,544 A | 9/1976 | Tomecek et al. |
| 4,006,453 A | 2/1977 | Bryant |
| 4,064,413 A | 12/1977 | Andersen |
| 4,325,052 A | 4/1982 | Koerner |
| 4,430,637 A | 2/1984 | Koch-Dilcker et al. |
| 4,751,431 A | 6/1988 | Ducote |
| 4,845,465 A | 7/1989 | Kruse et al. |
| 4,846,697 A | 7/1989 | Rodgers |
| 4,857,807 A | 8/1989 | Hargis |
| 4,859,982 A | 8/1989 | Seaburg |
| 4,939,503 A | 7/1990 | Swanson |
| 5,027,031 A | 6/1991 | Wheelock |
| 5,030,938 A | 7/1991 | Bondzeit |
| 5,157,376 A | 10/1992 | Dietz et al. |
| 5,212,469 A | 5/1993 | Avellino |
| 5,285,113 A | 2/1994 | Schlich |
| 5,389,823 A * | 2/1995 | Hopkins et al. ........... 307/10.1 |
| 5,498,929 A | 3/1996 | Formwalt, Jr. |
| 5,521,466 A | 5/1996 | Vincent |
| 5,666,103 A | 9/1997 | Davis, Jr. |
| 5,701,116 A | 12/1997 | Hoekstra |
| 5,760,545 A | 6/1998 | Mikel |
| 5,909,891 A | 6/1999 | Swart et al. |
| 6,232,722 B1 * | 5/2001 | Bryant et al. ................ 340/468 |

* cited by examiner

*Primary Examiner*—Anh La
(74) *Attorney, Agent, or Firm*—Woodard, Emhardt, Naughton, Moriarty & McNett LLP

(57) ABSTRACT

A novel vehicle signaling converter is disclosed. In one embodiment, inverted logic gates are used to provide low-true signals to a negative-logic power switch, which powers appropriate trailer lighting. In other embodiments, divergent current paths are provided for multiple signals to pass from a vehicle's lighting system to a trailer's lighting system, with each current path being independently current-limited. In still other embodiments, circuitry is placed within each of multiple lighting control signal paths that handles electrostatic discharge within a vehicle-trailer lighting signal converter.

20 Claims, 3 Drawing Sheets

VEHICLE-TRAILER SIGNAL CONVERTER

BACKGROUND

The present invention relates to vehicle signaling, and more particularly, but not exclusively, relates to a converter for connecting a vehicle's power and signaling system to a trailer's power and signaling system.

When a motor vehicle tows a trailing vehicle, government standards often require lighted signals to be maintained on the trailing vehicle that indicate the movement status of the vehicle and trailer. For example, left and right turn signal lights indicate a present or impending movement of the vehicle in the indicated direction. As another example, brake lights indicate application of the vehicle's brakes. Other lights, such as taillights and running lights, may be used to improve visibility of the vehicle and trailer.

For some systems, power for lighting on the trailer has been provided by a separate power source not connected to the towing vehicle. In others, signaling lamps on the trailer are tied directly to, and are powered by one or more circuits that power corresponding lamps on the towing vehicle. In some such embodiments, the additional load of the trailer lights on the vehicle's lighting control circuits can damage or destroy the vehicle's multiplexing unit (MUX) or engine control microcomputer (ECM).

Alternative designs have used power taken directly from the vehicle's battery, but have not been able to perform adequately under the sometimes harsh electrical conditions of an automotive environment.

There is, therefore, an ongoing need for improved reliability in trailer connection systems. There is a further need for methods, apparatus, and systems that reduce the impact of anomalies in power, signals, and circuitry to which a converter is exposed.

Unless otherwise specified, references to voltage herein are to DC (direct current) potential.

SUMMARY OF THE INVENTION

One form of the present invention is a unique vehicle-trailer lighting system. In another form, a condition-tolerant connector converts power and signals in a towing vehicle into signals usable by a trailer. Further forms include unique power/signal conversion methods and apparatus.

Some forms of the present invention provide improved management of short circuit conditions in trailer wiring. Other forms of the present invention provide a vehicle-trailer connector with improved electrostatic discharge characteristics. Still other forms of the present invention provide a vehicle-trailer connector with improved characteristics with respect to the vehicle's control circuitry.

Further forms, objects, features, aspects, benefits, advantages, and embodiments of the present invention shall become apparent from the detailed description and drawings provided herewith.

DETAILED DESCRIPTION OF SELECTED EMBODIMENTS

Figure 1:
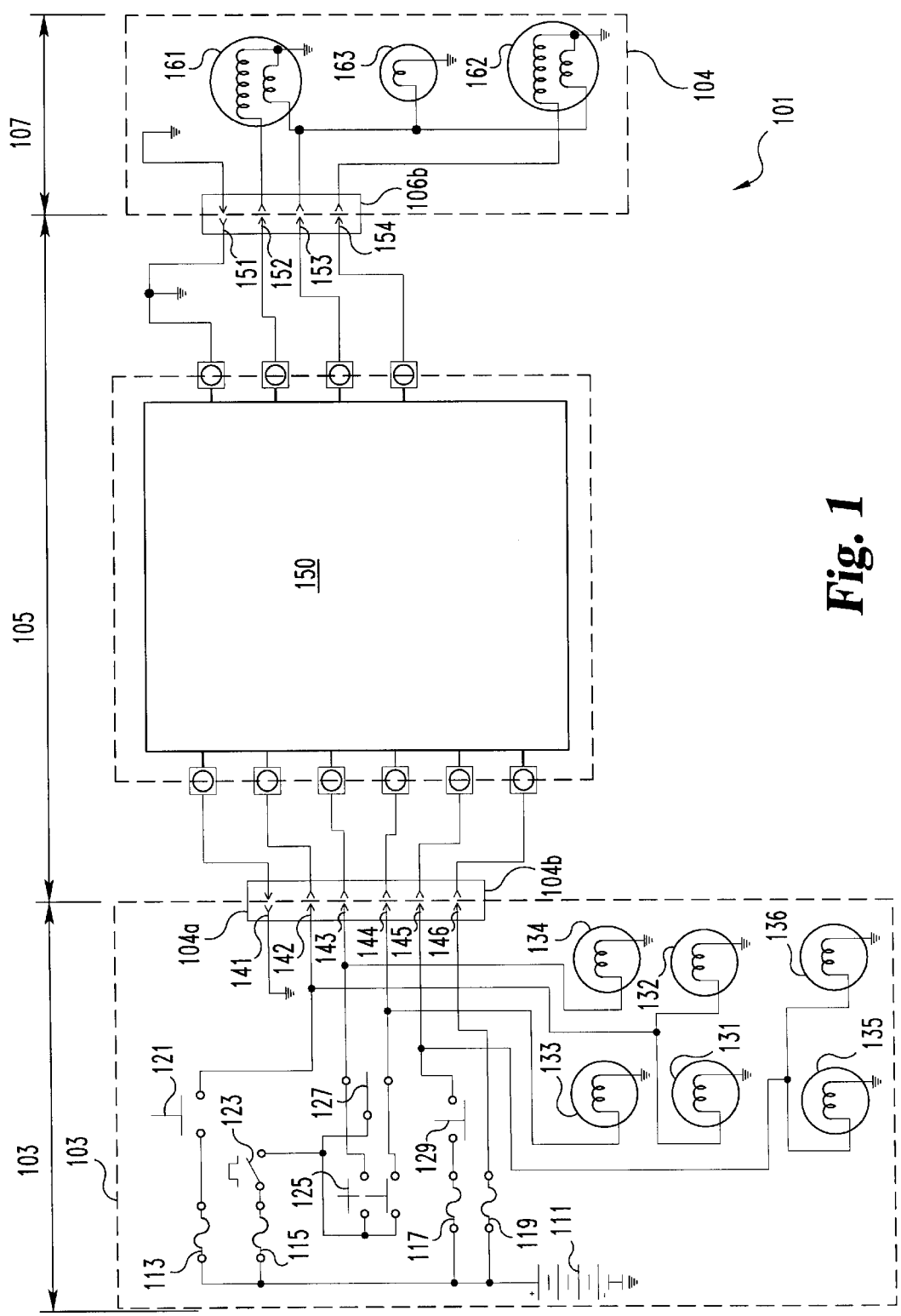
FIG. 1 is a schematic view of an electrical system.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments, and any further applications of the principles of the invention as described herein are contemplated as would normally occur to one skilled in the art to which the invention relates.

The embodiment of the invention that is described herein converts electrical signals in a towing vehicle's lighting system into signals usable by a trailer's lighting system. Within the converter, the signals from the vehicle are adjusted to voltage levels usable by negative-logic (XNOR) gates, and the gates control power switches. The power switches include transistors that are turned on and off to provide or stop current to the trailer lights, respectively. The switches also have current and temperature sensors with control circuitry arranged to reduce or remove electrical power supplied to one of the multiple lighting circuits in the trailer in the event of an anomalous power condition (such as a short circuit). The connector also protects the vehicle's control systems in such conditions, and from electrostatic discharge as well.

It is noted that, for brevity, "vehicle" is used herein to identify a towing vehicle, while "trailer" is used to identify the vehicle (of whatever nature) being towed. Neither identifier is intended otherwise to limit the scope or applicability of the present invention, nor of the claims that appear below.

FIG. 1 schematically illustrates electrical system 101. System 101 comprises vehicle circuitry 103 mounted on a lead, or towing, vehicle 102; converter circuitry 105 (shown and discussed in more detail in relation to FIG. 2 below) in converter 150; and trailer circuitry 107 mounted on a trailer 104. Vehicle circuitry 103 is connected to converter circuitry 105 via mating connectors 104a and 104b. Similarly, converter circuitry 105 is connected to trailer circuitry 107 via mating connectors 106a and 106b. In the embodiment shown, power for the whole system 101 is provided by the vehicle battery 111, which is a typical 12 V automotive battery. At least four circuits use voltage from vehicle battery 111 in parallel, including distinct circuits for brake, turning, taillight, and trailer power signals. Each of these circuits is protected by a fuse, namely fuses 113, 115, 117, and 119, respectively.

Brake switch 121, a single-pole, single-throw, double-break switch, preferably closes when the brake pedal of the vehicle is depressed. When closed, brake switch 121 passes current from vehicle battery 111 to brake lights 131 and 132. Brake lights 131 and 132 are preferably single-filament bulbs connected in parallel between brake switch 121 and ground.

Flasher switch 123 connects turn signal fuse 115 to the turn signal and hazard switch circuitry, which will be described next. Flasher switch 123 is controlled by means known in the art to provide current to turn signal and hazard lights with an appropriate on-off frequency and duty cycle.

One current path leaving flasher switch 123 passes through hazard switch 125, which in the present exemplary embodiment is a double-pole, single-throw, double-break switch. When hazard switch 125 is actuated, flasher switch 123 is activated to periodically open and close using methods known to those skilled in the art. While hazard switch 125 and flasher switch 123 are both closed, current flows from vehicle battery 111 through turn fuse 115, flasher switch 123, and hazard switch 125, then in parallel through vehicle turn lights 133 and 134 to ground.

An alternative current path from flasher switch 123 flows through right or left turning lights 133 or 134, respectively, via turn switch 127. Turn switch 127 is a single-pole, double-throw, normally open switch that is typically actuated by a driver's control lever to indicate an impending change of direction. When turn switch 127 is moved, for example, to its lower terminal, current flows from the positive terminal of vehicle battery 111 through turn fuse 115, flasher switch 123, turn switch 127, and right-side turning light 133 to ground. Flasher switch 123 is again preferably opened and closed by means well known to those skilled in the art to provide a flashing turn signal.

When turn switch 127 is closed at its upper terminal, current flows correspondingly from vehicle battery 111 through turn fuse 115, flasher switch 123, turn switch 127, and left-hand turning light 134 to ground.

Taillight switch 129 is typically actuated when a driver actuates the vehicle's head lights at one or more levels of brightness, and in the present exemplary embodiment comprises a single-pole, single-throw, double-break switch. When taillight switch 129 is closed, current flows from the positive terminal of vehicle battery 111 through taillight fuse 117 and taillight switch 129, then in parallel through taillight lamps 135 and 136 to ground.

It should be understood that many different component selections, switch types, and other design choices in the vehicle circuitry 103 described above can be made without departing from the spirit of this invention and the scope of the appended claims.

In the present exemplary embodiment, power, ground, and control signals are made available to converter circuitry 105 and trailer circuitry 107 via connector 104a. Connector 104a comprises connection points 141, 142, 143, 144, 145, and 146. Connection point 141 is wired to a ground point of the vehicle, and thereby provides a ground reference to the remainder of system 101.

Connection point 142 is wired to the junction between brake switch 121 and brake lights 131 and 132. This provides a brake signal to converter 150 for further use as detailed below. Connection point 143 is wired between the upper (left-turn) terminal of turn switch 127 and left-turn light 134, which provides an indication to converter 150 that the left-turn signal of the trailer should be illuminated. Connection point 144 is analogously situated between the lower (right-turn) terminal of turn switch 127 and right-turn light 131 to provide a right-turn indication signal.

Connection point 145 is wired between taillight switch 129 and taillight bulbs 135 and 136, thereby providing a signal to converter 150 that indicates whether the taillights of the trailer should be illuminated.

Finally, connection point 146 is wired via trailer power fuse 119 to the positive terminal of vehicle battery 111. In the present embodiment, all power for converter circuitry 105 and trailer circuitry 107 is provided via connection point 146.

Converter 150 receives the signals at connection points 141–146 via connector 104b and converts them to signals usable by trailer circuitry 107 at connector 106a. Specific conversion circuitry for this exemplary embodiment is discussed below, and provides a ground signal at connection point 151, a right-turn/brake signal at connection point 152, a left turn/brake signal at connection point 153, and a taillight signal at connection point 154.

Within trailer circuitry 107, connection point 151 is wired to a common ground. Connection point 152 is wired through the brighter filament of two-filament right-side light 161.

The taillight signal at connection point 153 is connected to the dimmer filament in each of the right-side light 161 and left-side light 162, as well as one or more "marker," or "running," lights 163. Connection point 154 of connector 106b is wired to the brighter filament of two-filament right-side light 162. Bulbs 161, 162, and 163 are placed in appropriate locations on the trailer.

Converter 150 will now be described in more detail with reference to FIG. 2 and with continued reference to FIG. 1. Common reference numerals will be used to refer to common elements between the figures.

Local ground enters converter 150 via connection point 141, which is connected directly to the output to trailer circuitry 107 at connection point 151. The cathode of diode 201 is wired to this ground connection, and the anode of diode 201 is connected to a local ground 203. This diode 201 provides a bias in local ground 203 and protection against certain abnormal conditions, as discussed below.

The power signal enters converter 150 at connection point 146, as discussed above. Bipolar Transil 205 is connected between connection point 146 and local ground 203. Transil 205 preferably has a breakdown voltage of 47 V. In this exemplary embodiment Transil 205 provides protection to trailer circuitry 107 in the event that the power signal provided by vehicle circuitry 103 via connection point 146 dramatically exceeds the expected power input voltage.

The signals from each of connection points 142, 143, 144, and 145 are passed through signal conditioners 207a, 207b, 207c, and 207d, respectively, (collectively designated conditioners 207) which adapt the input signals for use by the downstream logic discussed below, and which provide other anomaly-handling features, some of which are discussed below. It should be noted that while the internal circuitry for only signal conditioner 207a is shown in FIG. 2, the remaining signal conditioners 207b, 207c, and 207d contain identical circuitry, and the corresponding inputs and outputs are situated in the same relative positions in each block 207.

A signal entering a signal conditioner 207 first passes through forward-biased input diode 211 to reach junction point 212. Two parallel signal paths connect junction point 212 with junction point 214, which is wired to local ground 203. The first is simply resistor 213, which provides a drain path to local ground 203 for any charge that has passed through input diode 211, but cannot reach ground via another path when the switch(es) downstream turn off. The second path from junction 212 to junction 214 is through the series combination of resistor 215 and zener diode 217, the point between the two being referred to herein as junction 216. Zener diode 217 preferably has a breakdown voltage of 5.1 V, and maintains a potential differential between junction 214 and junction 216 that is suitable for operating downstream CMOS logic gates 210 (which will be discussed below). Signal conditioner 207 provides a lower output 206, which is wired directly to junction 216, and an upper output 208, which is wired to the cathode of diode 219. The anode of diode 219 is wired to junction 216.

In this exemplary embodiment, the upper outputs 208 of each of the four signal conditioners 207 are tied together and provide power to CMOS chip 209, which preferably comprises four XNOR gates 210a, 210b, 210c, and 210d. The ground pin of chip 209 is wired to local ground 203. For clarity, gates 210a, 210b, and 210c in chip block 209 are shown separately from the chip block 209 in FIG. 2. In this exemplary embodiment, gate 210d on chip 209 remains unused. In other embodiments, other negative logic gates, such as NAND, NOR, and NOT (inverter) gates, are used to provide a "low=on" signal to the downstream logic.

As will next be discussed, the outputs of conditioners 207 in the present embodiment are combined as logical values to drive power switches 223a–223c. Using the following logic, the right turn/brake light 161 is activated when a brake signal is present at connection point 142, or when the right turn signal is present at connection point 144, but not both. By using this "exclusive OR" combination, the right turn/brake light 161 will be flashed whenever the turn switch 127 is moved to the lower terminal and the flasher switch 123 is active, whether or not the brake switch 121 is closed. Analogous logic is applied to the left turn signal from connection point 143 and the brake signal from connection point 142.

XNOR gate 210a has as its two inputs the lower outputs of signal conditioning blocks 207c and 207a, and its output is wired through resistor 221a to the input of power switch 223a. Similarly, XNOR gate 210b takes its two inputs from the lower outputs 206 of signal conditioner blocks 207a and 207b, thereby combining the conditioned brake and left turn input signals. The output of XNOR gate 210b is passed through resistor 221b to the control input of power switch 223b.

XNOR gate 210c is wired as an inverter as follows. One input of XNOR gate 210c is tied to local ground 203, while the other input of XNOR gate 210c is taken from the lower output 206 of signal conditioner block 207d, making the output the logical inverse of the taillight input signal at connection point 145. The output of XNOR gate 210c is passed through resistor 221c to the control input of power switch 223c.

The $V_{cc}$ inputs of power switches 223a, 223b, and 223c (generically designated switches 223) are wired to the power input at connection point 146 (as clamped by Transil 205) for use by downstream components as discussed below. The outputs of power switches 223a, 223b, and 223c are wired to connection points 152, 154, and 153, respectively. These connection points provide powered signals for the right-hand turn/brake lights, taillights, and left-hand turn/brake lights, respectively, of trailer circuitry 107 as discussed above in relation to FIG. 1.

While any power switch with suitable characteristics can be used, power switches 223 are preferably part number IPS5551T from International Rectifier, 223 Kansas Street, El Segundo, Calif., 90245, USA, which will now be described with additional reference to FIG. 3. The IPS5551T contains a metal-oxide-semiconductor field-effect transistor (MOSFET) 310, the drain of which typically accepts an input signal (such as a power source) $V_{cc}$, and the source of which provides output signal $V_{out}$. Internal logic unit 320 uses input signal $V_{in}$ and $V_{cc}$ to control (via control component 330) the gate junction of MOSFET 310, and thus output $V_{out}$, according to the following table:

| Operating Conditions | $V_{in}$ | $V_{out}$ |
| --- | --- | --- |
| Normal | L | H |
| Normal | H | L |
| Over-current | L | L (latched) |
| Over-current | H | L |
| Over-temperature | L | L (latched) |
| Over-temperature | H | L |

That is, under normal operating conditions, the output voltage $V_{out}$ of power switch 223 is raised to approximately $V_{cc}$ by conduction of internal MOSFET 310 through power switch 223 if and only if the voltage difference between the power signal and the input signal (i.e., $V_{cc}-V_{in}$) exceeds an input threshold $V_{ih}$. When $V_{cc}-V_{in}$ is lower than a second threshold (i.e., $V_{cc}-V_{in}<V_{il}$ where $V_{il}<V_{ih}$), the internal transistor 310 is turned off, allowing the output voltage $V_{out}$ to fall to ground potential (because current ceases to flow through resistive filaments in lamps 161, 162, and 163 (see FIG. 1)).

If the current through power switch 223 (from the $V_{cc}$ terminal to the $V_{out}$ terminal) exceeds a predetermined threshold (e.g., 100A), the switch control logic 330 within power switch 223 latches the output $V_{out}$ in the low state until the over-current condition passes. Similarly, when the temperature of transistor 310 exceeds a certain threshold (e.g., 165° C.), the internal control logic unit 330 of power switch 223 latches output $V_{out}$ low until the over-temperature condition passes.

In the context presented in this exemplary embodiment, the use of power switch 223 with the above characteristics in the above configuration provides independent protection on each of the three signal lines (right via connection point 152, left via connection point 154, and taillights via connection point 153) for over-current and over-temperature conditions, such as those conditions that might be caused by a short in trailer circuitry 107. It can be observed that a short in the trailer wiring for left turn light 162, for example, while power switch 223b was turned on would quickly cause an over-current condition in power switch 223b, but would not affect the current passing through power switches 223a or 223c. Power switch 223b would shut down (i.e., turn off, or change its $V_{out}$ to ground), but power switches 223a and 223c would remain operational. Hence, although the left-turn/brake circuit is shut down, the right-turn/brake circuit and taillight circuit can still function, providing safety benefits in the event of a partial failure of trailer circuitry 107. In addition, in this exemplary embodiment, power switches 223 operate quickly to shut down before any of the fuses 113, 115, 117, or 119 blow.

Figure 2:
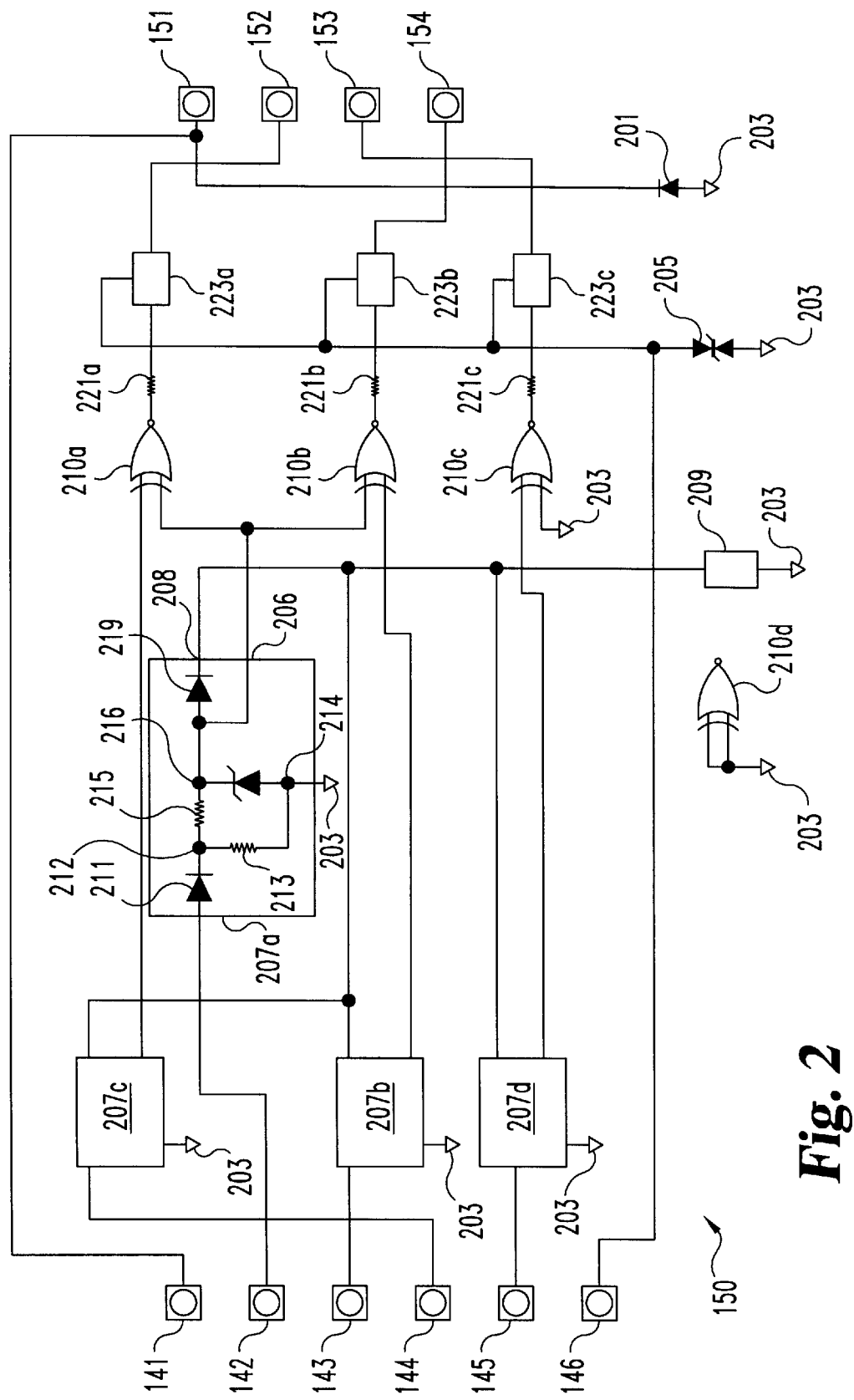
FIG. 2 is a schematic view of a vehicle-trailer lighting signal converter of the system of FIG. 1.

With reference to FIGS. 1 and 2, it can be observed by those skilled in the art that diode 201 establishes a bias between the local ground 203 in converter 150 and the ground in vehicle circuitry 103 and trailer circuitry 107. Under normal operating conditions, diode 201 puts local ground 203 slightly (e.g., about 0.7 V) above the ground potential at connection points 141 and 151. When the current path from converter 150 to the ground terminal of vehicle battery 111 is poor or absent (one possible abnormal operating condition), diode 201 allows the potential at local ground 203 to rise to approximately the power signal potential presented at connection point 146, as can be seen from the circuitry described above. This reduced differential in potential between local ground 203 and the power signal at connection point 146 turns off power switches 223, as can also be appreciated from the discussion herein.

Figure 3:
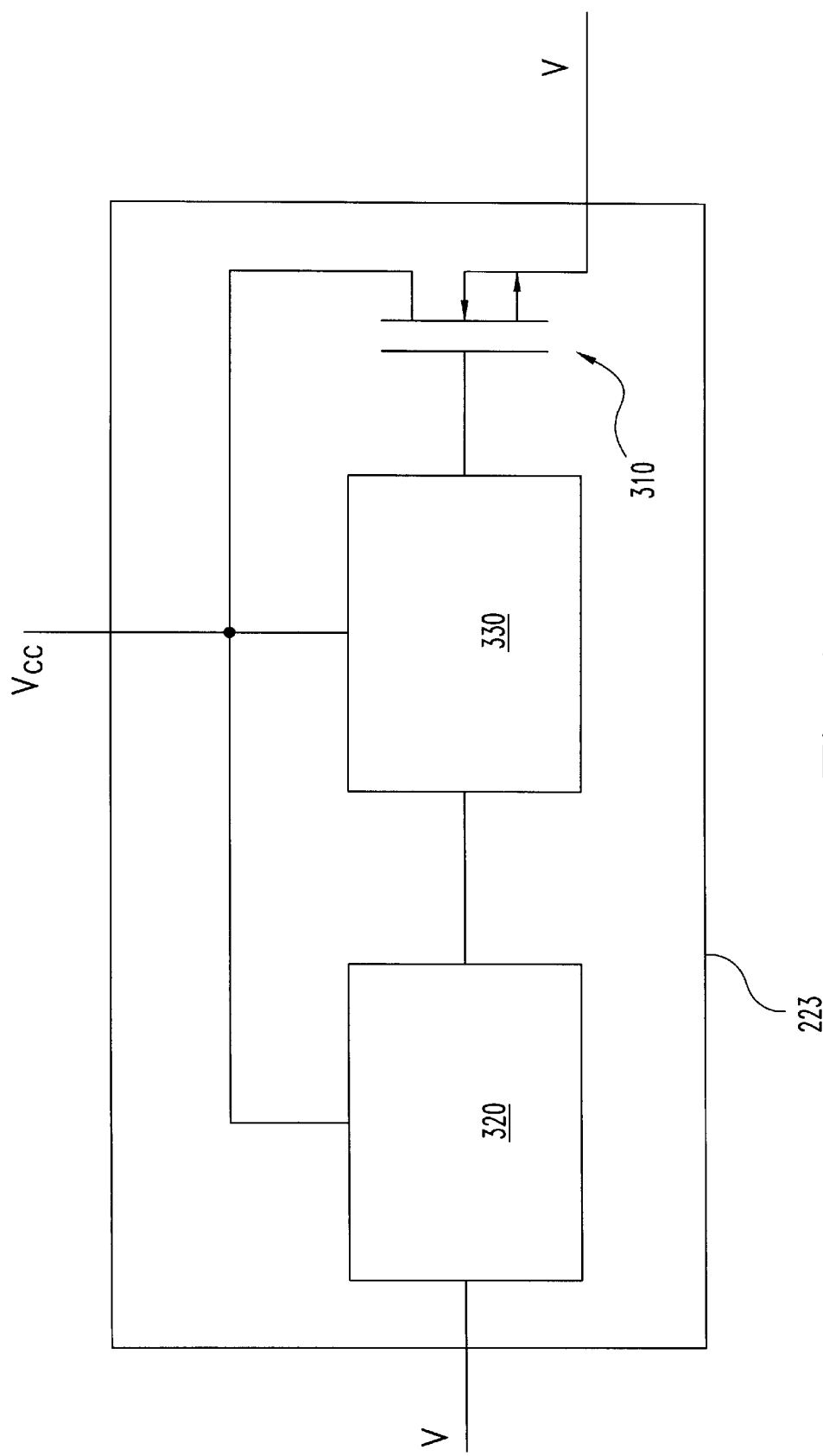
FIG. 3 is a schematic view of a power switch of the system of FIG. 1.

With additional reference to FIG. 3, it can also be observed by those skilled in the art that the use of negative-logic power switches 223 will in some embodiments provide additional protection against certain power anomalies. For example, in the embodiment shown in the figures discussed above, a substantial variation in power voltage supplied by signals at connection points 142, 143, 144, or 145, is still likely to enable the voltage at junction point 216 (in the respective signal conditioning block 207) to be maintained at a level that registers as "true" to XNOR gate(s) 210. If the remaining. input to the relevant gate(s) 210 remains low (false), then the output of gate(s) 210 will be low (since "true" XNOR "false"="false"), and the corresponding switch(es) 223 will be turned on. Even if the power signal supplied at connection point 146 also varies from the expected level, as long as it exceeds $V_{in}$ by at least the threshold voltage $V_{th}$, whatever power voltage being provided via connection point 146 will be passed through power switches 223 to the appropriate trailer bulb(s) 161, 162, and/or 163 via connector 106. The above exemplary embodiment also handles several abnormal power conditions that can be present in an automotive environment and are specified in Society of Automotive Engineers (SAE) standard J1113/11, including (A) double battery, (B) reverse battery, (C) no ground, (D) poor ground, (E) positive spikes to +80V, (F) negative spikes to −100V, and (G) 18V input.

Furthermore, when no trailer circuitry 107 is connected in the system, and each connection point in connector 106a is left "floating," very little current is drawn from battery 111 by connector circuitry 105. In the absence of brake, turn, and taillight signals at connection points 142, 143 and 144, and 145, respectively, no substantial current path exists from a powered line to ground. When a brake, turn, or taillight signal is presented at connector 104 (which is likely only when the vehicle is operating and the vehicle's alternator is also available as a power source), current can pass through resistor 213 in the respective signal conditioner 207, which current amounts only to approximately 23.5 mA. Thus, the presence of a converter 150 without a trailer will have little impact on battery drain.

Yet further, when a trailer is present and the signal(s) from one or more of connection points 142, 143, 144, and 145 are used by converter 150 to activate power to a trailer bulb 161, 162, and/or 163, very little current is drawn through those connection points 142, 143, 144, and 145, thereby having little impact on the vehicle's ECM or MUX.

One form of the invention connects a vehicle's lighting system to a trailer's lighting system, and includes a vehicle lamp control signal input, a trailer lamp signal output, a negative logic gate (as non-limiting examples, NOR, XNOR, NAND, or inverter gate), and a power switch having three leads and a predetermined threshold voltage. The negative logic gate has one or more gate inputs and a gate output, wherein at least one of the gate inputs is connected (preferably by a signal conditioning circuit) to the vehicle lamp control signal input. A first one of the power switch leads is connected to a power signal. Another of the power switch leads is connected to the trailer lamp signal output, while the third power switch lead is controlled by the gate output. Under normal operating conditions, the power switch conducts from the first lead to the second lead when the electrical potential at the first lead exceeds the electrical potential at the third lead by at least the predetermined threshold voltage.

In one refinement of the form of the invention described in the preceding paragraph, the power signal comes from a power signal input. In another refinement, the power signal comes from the vehicle lamp control signal input.

Another form of the invention connects a master vehicle lighting system to a slave vehicle lighting system and includes a lighting signal input from the master vehicle lighting system, a ground input from the master vehicle lighting system, a first diode (the anode of which is connected to the lighting signal input), a second diode (the cathode of which is connected to the ground input), a resistor, and an output circuit means. The resistor has two leads, one of which is connected to the cathode of the first diode to form a first junction, and the other of which is connected to the anode of the second diode to form a second junction. The output circuit means, connected to the second junction and the first junction, converts the signal between the second junction and the first junction into an output signal usable by the slave vehicle lighting system.

Some of the embodiments of the form of the invention described in the preceding paragraph also include a power input from the master vehicle lighting system. In some these embodiments, the output circuit means includes a zener diode, a logic gate, and a semiconductor switch. The zener diode is connected at its anode to the second junction, and at its cathode to the first junction. The logic gate has one or more gate inputs and a gate output, at least one of the gate inputs being connected to the cathode of the zener diode. The semiconductor switch has a switch input, a power lead, and a switch output, where the switch input is connected to the gate output, the power lead is connected to the power input, and the switch output is provided to the slave vehicle lighting system.

Yet another form of the invention connects a vehicle's lighting system to a trailer's lighting system and includes a vehicle-side connector, a trailer-side connector, adapter logic, and multiple independently current-limited signal connections. The vehicle-side connector includes a power input, a ground input, and multiple signal inputs. The trailer-side connector includes a ground output and multiple signal outputs. The adapter logic includes a ground connection between the ground input and the ground output. Each of the signal connections is between an input group of the signal inputs and an output group of the signal outputs; and each connection draws current through the power input when it is active.

What is claimed is:

1. An apparatus for connecting a vehicle's lighting system to a trailer's lighting system, comprising:
    a vehicle lamp control signal input;
    a trailer lamp signal output;
    a negative logic gate having one or more gate inputs and a gate output, wherein at least one of said gate inputs is connected to said vehicle lamp control signal input; and
    a power switch having a first lead, a second lead, a third lead, an electrical potential difference between said first lead and said third lead, and a first predetermined threshold voltage, wherein:
       said first lead is connected to a power signal;
       said second lead is connected to said trailer lamp signal output;
       said third lead is controlled by said gate output; and
       said power switch conducts from said first lead to said second lead when said electrical potential difference exceeds said first predetermined threshold voltage under normal operating conditions.

2. The apparatus of claim 1, wherein said negative logic gate is an XNOR gate.

3. The apparatus of claim 1, wherein said negative logic gate is a NOR gate.

4. The apparatus of claim 1, wherein said negative logic gate is a NAND gate.

5. The apparatus of claim 1, wherein said negative logic gate is an inverter gate.

6. The apparatus of claim 1, wherein said second lead is connected by a resistor to said trailer lamp signal output.

7. The apparatus of claim 1, wherein said power switch comprises a field-effect transistor.

8. The apparatus of claim 7, wherein said power switch comprises a metal-oxide-semiconductor field-effect transistor (MOSFET).

9. The apparatus of claim 1, wherein said power switch further has a second predetermined threshold voltage that is less than said first predetermined threshold voltage, and allows substantially no current to pass from said first lead to said second lead when said electrical potential difference is less than said second predetermined threshold voltage under normal operating conditions.

10. The apparatus of claim 1, further comprising a power input, and wherein said power signal is connected to said power input.

11. The apparatus of claim 1, wherein said power signal is connected to said vehicle lamp control signal input.

12. An apparatus for connecting a master vehicle lighting system to a slave vehicle lighting system, comprising:
   a lighting signal input from the master vehicle lighting system;
   a ground input from the master vehicle lighting system;
   a first diode, the anode of which is connected to said lighting signal input;
   a second diode, the cathode of which is connected to said ground input;
   a first resistor having a first lead and a second lead, wherein
      said first lead is connected to the cathode of said first diode to form a first junction;
      said second lead is connected to the anode of said second diode to form a second junction; and
   an output circuit means, connected to said second junction and said first junction, for converting the signal between said second junction and said first junction into an output signal usable by the slave vehicle lighting system.

13. The apparatus of claim 12, further comprising at least one slave vehicle light in the slave vehicle lighting system, and wherein said output circuit means powers said at least one slave vehicle light from said lighting signal input.

14. The apparatus of claim 12, further comprising at least one slave vehicle light in the slave vehicle lighting system, and wherein said output circuit means powers said at least one slave vehicle light from a power line of the master vehicle lighting system.

15. The apparatus of claim 12, further comprising a power input from the master vehicle lighting system; and wherein said output circuit means comprises:
   a zener diode, the anode of which is connected to said second junction, and the cathode of which is connected to said first junction;
   a logic gate having one or more gate inputs and a gate output, at least one of said gate inputs being connected to the cathode of said zener diode; and
   a semiconductor switch, having a switch input, a power lead, and a switch output, wherein:
      said switch input is connected to said gate output;
      said power lead is connected to said power input; and
      said switch output is provided to the slave vehicle lighting system.

16. The apparatus of claim 15, further comprising a second resistor connected between the cathode of said zener diode and said first junction.

17. The apparatus of claim 15, wherein said switch input is connected to said gate output by a third resistor.

18. An apparatus for connecting a vehicle's lighting system to a trailer's lighting system, comprising:
   a vehicle-side connector comprising a power input, a ground input, and a plurality of signal inputs;
   a trailer-side connector comprising a ground output and a plurality of signal outputs; and
   adapter logic comprising:
      a ground connection between said ground input and said ground output; and
      a plurality of signal connections, each between an input group of one or more of said signal inputs and an output group of one or more of said signal outputs, each said signal connection being independently capable of shutting off current, and each said signal connection drawing current through said power input when said signal connection is active.

19. The apparatus of claim 18, each of said signal connections comprising:
   a current sensing means for sensing an over-current condition, said current sensing means being connected to said input group; and
   a transistor having a first lead, a second lead, and a third lead, wherein:
      said first lead is connected to said power input;
      said third lead is connected to said output group; and
      said second lead is connected to said current sensing means.

20. The apparatus of claim 18, each of said signal connections comprising:
   a temperature sensing means for sensing an over-temperature condition, said temperature sensing means being connected to said input group; and
   a transistor having a first lead, a second lead, and a third lead, wherein:
      said first lead is connected to said power input;
      said third lead is connected to said output group; and
      said second lead is connected to said temperature sensing means.

* * * * *